United States Patent [19]
Davis

[11] 4,134,469
[45] Jan. 16, 1979

[54] LINEAR TURBINE
[75] Inventor: Ralph A. Davis, Wichita, Kans.
[73] Assignee: Turbopanel Motors, Inc., Wichita, Kans.
[21] Appl. No.: 730,859
[22] Filed: Oct. 8, 1976
[51] Int. Cl.² .......................... B60L 11/00; H02J 7/14
[52] U.S. Cl. .................... 180/65 DD; 290/55; 415/5
[58] Field of Search ............ 180/1 R, 65 DD; 415/5; 290/43, 44, 54, 55, 58; 416/7-9

[56] References Cited
U.S. PATENT DOCUMENTS

| 763,623 | 6/1904 | Nance | 415/5 |
|---|---|---|---|
| 1,187,601 | 6/1916 | Blackmore | 415/5 X |
| 1,266,472 | 5/1918 | Howe | 416/8 |
| 1,568,718 | 1/1926 | Brattland | 415/5 X |
| 3,713,503 | 1/1973 | Haan | 290/44 X |
| 3,730,643 | 5/1973 | Davison | 415/5 |
| 3,743,848 | 7/1973 | Strickland | 290/44 |
| 4,049,300 | 9/1977 | Schneider | 290/54 |

FOREIGN PATENT DOCUMENTS 629798  9/1949  United Kingdom ......................... 416/8

Primary Examiner—Kenneth H. Betts
Attorney, Agent, or Firm—Robert E. Breidenthal

[57] ABSTRACT

A turbine in the form of an endless "Venetian blind" set of arcuate turbine blades mounted to extend between a pair of endless chains that are entrained over sets of sprockets so that two flights of the blades travel in opposite directions in closely spaced parallel planes. Shafts connect sprockets of the sets to maintain the blades parallel and to deliver to an alternator the torque applied to the sprockets by the reaction of the blades to a fluid passing therethrough.

7 Claims, 10 Drawing Figures

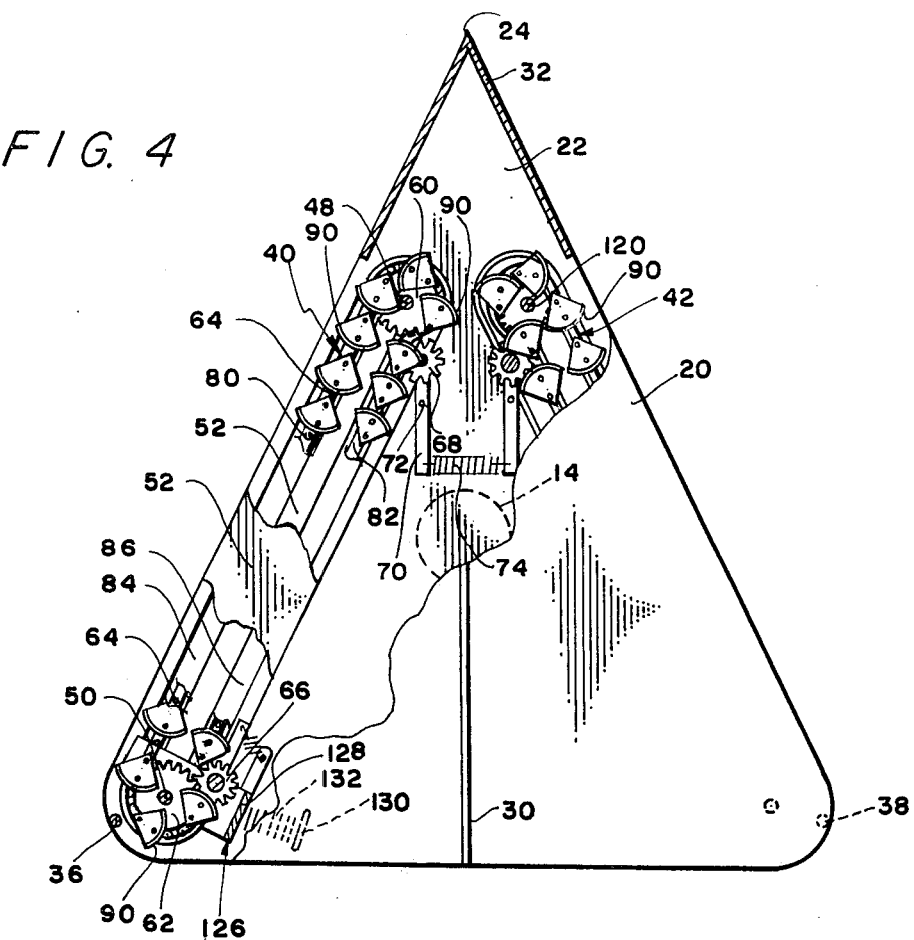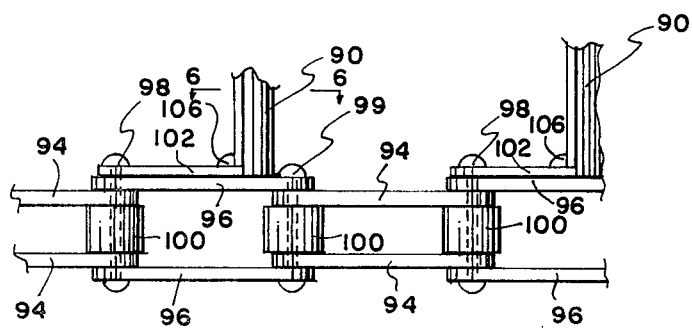

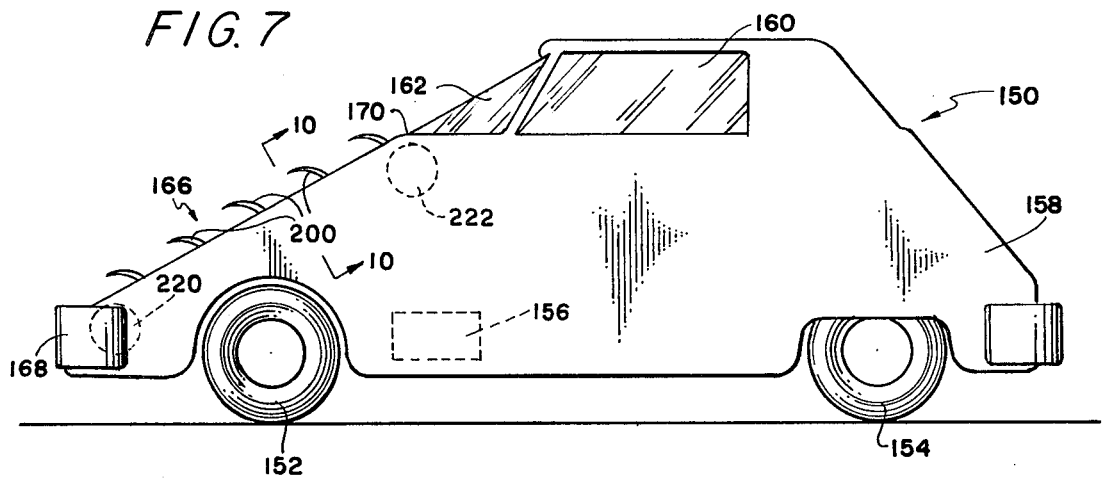
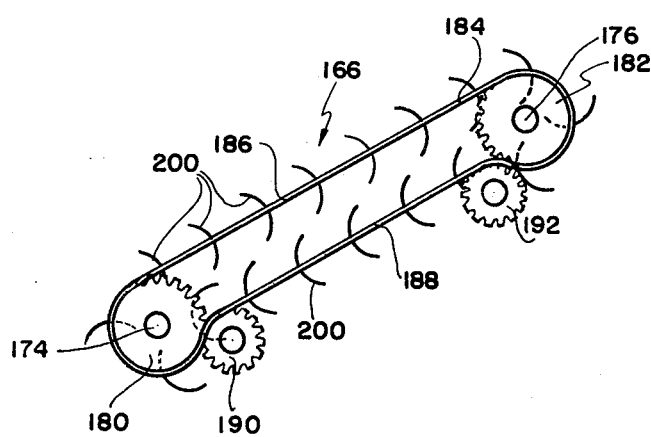
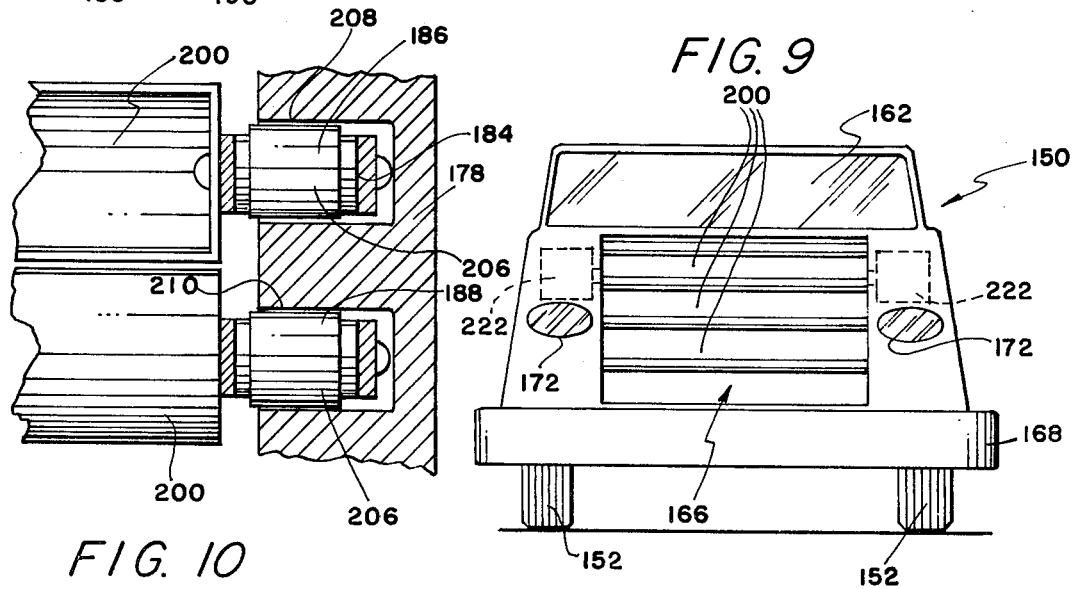

LINEAR TURBINE

The present invention relates to new and useful improvements in turbines and more particularly relates to a turbine and associations of such turbines enabling efficient extraction of energy from a moving fluid.

The primary object of the present invention is to enable the efficient extraction of energy from a moving fluid.

Another object of the invention is to reduce the power lost from a moving vehicle by air drag by extracting energy from that part of relative wind that impedes progress of the vehicle. Such extracted energy is applied to reduce the energy requirements of the vehicle that must otherwise be supplied from such sources as those derived from fossil fuels, nuclear energy, solar energy, and so forth.

Yet another object is to provide a turbine having a relatively large energy extraction aperture in relation to the dimensions and weight of the turbine.

Still another object of the invention is to provide a turbine having an active energy extraction aperture of generally rectangular configuration rather than an active aperture constrained to a circular configuration.

A final object to be specifically recited is to provide a turbine that is immersible in a moving fluid and which turbine will weathervane to face directly into the fluid stream and which turbine will react to excessive fluid velocities to reduce its effective aperture and thereby reduce the possibility of damage.

One broad aspect of the invention involves a fluid motion actuated power panel comprising a series of spaced elongated turbine blades, means for guiding each of said blades to serially travel a closed endless path that includes first and second portions, means for maintaining the blades traveling the respective portions of the path in spaced parallelism with each other, said first and second portions of the path having extents that are in closely spaced proximity to each other with free running clearance between the blades moving therealong, said path portions and the blades being so constructed and arranged that the blades move along said first and second portions in opposite directions and so that a fluid can sequentially pass through and react with the blades moving along the first and second portions of the portions of the path, means for maintaining the blades moving respectively along the first and second portions of the path oriented to react with a fluid sequentially passing through such portions to urge such movement, and energy transducing means operatively coupled to the blades to be driven by the latter to produce an energy output.

Another broad aspect of the invention involves a fluid actuated turbine power panel comprising a pair of parallelly spaced, elongated spars having parallel shafts rotatably carried thereby and extending therebetween adjacent their opposite ends, each of said shafts being provided with a pair of pulleys adjacent its opposite ends, a pair of parallelly spaced endless flexible members entrained over the pulleys in an arrangement such that the members move in unison in proximity to the respective spars during rotation of the shafts, idler pulley means carried by the spars adjacent the pulleys for causing each member to have two closely spaced first and second parallel flights between the two shafts, each of said spars and the endless member adjacent thereto having coacting guide means for maintaining the spacing of the parallel flights of such members, and a plurality of elongated turbine blades of arcuate section extending, in spaced parallelism to each other and the shafts, between and having their opposite ends attached to the endless members, and energy transducer means operatively driven by one of said shafts.

The invention will be best understood and the objects and advantages thereof better appreciated on considering the following description of preferred embodiments thereof, such description being given in conjunction with the accompanying drawings illustrative thereof, wherein:

FIG. 4 is an enlarged top plan view of the apparatus shown in FIGS. 1-3, with a part of the top being broken away to reveal the sprocket and chain arrangement as well as details of the wind relief or retraction structure;

FIG. 5 is an enlarged fragmentary detail of the manner in which the end of a turbine blade is attached to the chain;

FIG. 6 is an enlarged fragmentary detail taken upon the plane of the section line 6—6 in FIG. 5;

Figure 1:
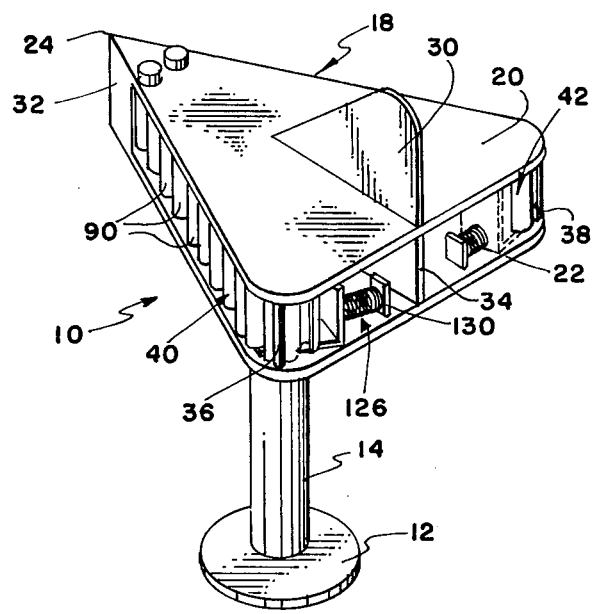
FIG. 1 is an isometric view of a turbine combination according to the invention for extracting energy from the wind, the same being omnidirectional and such as to reduce its effective aperture in high winds.

FIG. 7 deals with a modification of the invention and is a side elevational view of a self propelled vehicle having a portion of its frontal aspect constituted of a linear turbine according to the invention with certain hidden details being indicated in dashed outline;

FIG. 8 is a side elevational view of the turbine of FIG. 7 shown apart from the vehicle;

FIG. 9 is a front elevational view of the apparatus shown in FIG. 8, with hidden details being shown in dashed outline; and, FIG. 10 is an enlarged sectional detail view of the means for guiding parallel chain flights between and for maintaining the spacing of the main sprockets, such view being taken upon the plane of the section line 10—10 in FIG. 7.

Reference is now made to the drawings, wherein like numerals designate like parts throughout the various views, with attention being initially directed to the embodiment of the invention shown in FIGS. 1-6, wherein the reference numeral 10 designates generally a wind power installation comprising a stable base 12 and a fixed support column 14 rising therefrom. The column 14 is hollow to accommodate electric power conduits connected to electric alternators through rotary couplings. As suitable rotary electric couplers and electric conduits are well known and do not in themselves constitute the present invention, they are neither shown nor described as no useful purpose would be served and because such would only tend to obfuscate the actual invention.

Rotatably mounted atop the column 14 for free rotation about a vertical axis by means indicated generally at 16 is a wind power unit designated generally at 18. The unit 18 is generally of triangular configuration and includes vertically spaced, upper and lower walls 20 and 22, respectively, which are rigidly joined by means presently to be described.

Figure 2:
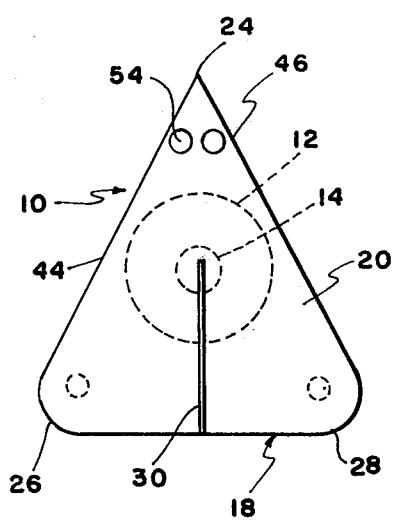
FIG. 2 is a top plan view of the construction shown in FIG. 1.
Figure 3:
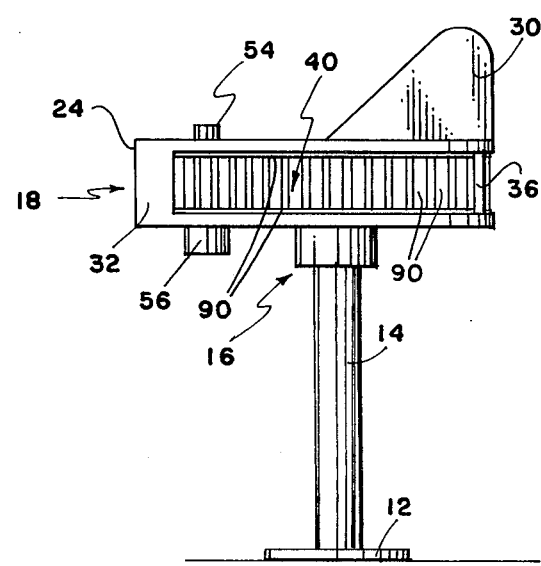
FIG. 3 is a side elevational view of the apparatus shown in FIGS. 1 and 2.

As best shown in FIG. 2, the unit 18 is essentially of an isosceles triangle shape with the apex being at 24 and the equal angular positions are disposed at 26 and 28.

Means in the form of an upstanding medial fin 30 fixed to the top wall 20 is provided to cause the unit 18 to weathervane or to maintain the apex 24 directed into ambient wind.

The apex 24 is a sharp acute angle and the walls 20 and 22 are rigidly joined at the apex 24 by a "V" shaped wall or sharp edged member shown at 32. The walls 20 and 22 are additionally rigidly joined by a vertical medial wall 34 that underlies the fin 30. The walls 20 and 22 are additionally joined by vertical posts 36 and 38 at the rear corners or tips 26 and 28.

A pair of power panels or linear turbines 40 and 42 are mounted between the walls 20 and 22 to extend along the divergent sides 44 and 46 of the power unit 18.

The power panels 40 and 42 and their mounting in the power unit 18 are mirror images of each other, and a detailed description of the power panel 40 and its mounting will suffice for both.

The power panel 40 comprises a pair of vertical shafts 48 and 50 that have their upper and lower end portions journaled through elongated upper and lower spar structures that are respectively positioned adjacent the lower and upper surfaces of the walls 20 and 22. The lower spar structure is visible in FIG. 4 and is designated at 52, it being understood that the upper spar structure directly overlies the spar structure 52 and is fixed thereto in relatively fixed spatial relationship by any suitable means, not shown.

The shaft 50 has its upper end journaled through the wall 20 at 54 and the lower end of the shaft 50 rotatably extends through the wall 22 to drive an electric alternator 56 fixed to the underside of the wall 22 in alignment with the shaft 50.

Upper and lower vertically spaced sprockets 60 are fixed to the shaft 48 to rotate in unison therewith, and corresponding upper and lower vertically spaced sprockets 62 are fixed to the shaft 50 to rotate therewith, and a pair of upper and lower endless chains 64 are respectively entrained over the upper and lower sprockets of the pairs thereof 60 and 62.

Means are provided with respect to each chain 64 to maintain the chain taut and elongated flights thereof in closely spaced parallel relationship to each other. Such means comprises upper and lower idler sprockets 66 rotatably carried by the spars 52 in close proximity to the sprockets 62, as well as upper and lower idler sprockets 68 disposed adjacent the sprockets 60. The sprockets 68 are urged to bear against the chains 64 by means comprising the sprockets being mounted on levers 70 that are in turn pivoted to the walls 20 and 22 at 72. Coiled tension springs 74 connect the levers 70 of the panels 40 and 42 to cause the idler sprockets 68 to bear against their respective chains 64.

The power panel 40 as thus far described is free to pivot about the vertical axis defined by the shaft 48 relative to the walls 20 and 22, and indeed a limited amount of such pivotal movement is desired, it being understood that portions of the lower spar structure 52 slidingly engages the upper surface of the bottom wall 22 whereby the power panel 40 is slidingly supported.

To augment the function of the idler sprockets 66 and 68 in maintaining oppositely moving flights 80 and 82 of the chains 64 in closely spaced parallel relationship, the adjacent upper and lower faces of the lower and upper spar structures 52 are respectively provided with parallel guide slots or grooves 84 and 86 that respectively guidingly receive therein the adjacent sides of the chains 64.

As thus far described, the power panel 40 comprises upper and lower parallel chains 64 movable in unison with each chain 64 including closely spaced elongated oppositely moving flights 80 and 82. In addition, the power panel is permitted limited pivotal movement about the vertical axis of the shaft 48, while deriving support from the bottom wall 22.

The reactive components of the power panel 40 comprise a plurality of elongated turbine blades 90 that are of arcuate cross section as best shown in FIG. 6. The blades 90 extend at right angles directly between the chains 64 and have their opposite ends secured to the latter by means presently to be described. The blades 90 are all parallel to each other and are connected to the chains 64 at equal intervals along the entire extents of the latter.

The relationship of the blades 90 to the chains 64 along each of the flights 80 and 82 of the latter can readily be likened to a Venetian blind.

The connection of an end of a turbine blade 90 to a link of a chain 64 is shown in FIGS. 5 and 6 wherein it will be seen that the chain is constituted of alternate closely spaced inner and widely spaced outer pairs of links 94 and 96, with adjacent pairs being pivotally secured by pivot pins 98 and 99 with rollers 100 being disposed at such pivotal connections, as is essentially customary. The chain 64 differs from the usual construction in that the outer links 96 on one side of the chain 64 are connected to blades as will now be described. The blade 90 has a flange 102 fixed to an end thereof to extend from the concave side 103 of the blade 90, and the flange 102 is pivoted to the link 96 by the pivot pin 98, as shown. The flange 102 is provided with a short arcuate slot 104 which receives a headed post 106 fixed to the link 96 in an arrangement permitting a limited pivotal movement of the blade 90 away from its illustrated central position relative to the link 96 about its longitudinal dimension (axis of the pins 98), coiled compression springs 107 being provided for yieldingly urging the same toward its illustrated normal central position. The springs 107 have their remote ends fixed to the flange 102 and their adjacent ends bearing against the post 106.

The arcuate curvature of the blade 90 can conveniently be about 140° and conform generally to a partial circular cylindrical configuration. The pivot pin 98 can coincide with the center of such a cylindrical configuration, but is preferably spaced from the concave side 103 of the arcuate blade 90 a distance less than the radius of curvature of the latter.

The blades 90 are disposed so that the concave sides 103 of the blades 90 attached to the part of the chain 64 in the laterally outermost flight 80 face the apex 24 in which case the blades in flight 82 have their concave sides 103 facing from the apex 24.

The operation of the power panel 40 as thus far described will be readily understood. Relative wind moving downwardly in parallel with the fin 30 as viewed in FIG. 4 will encounter the concave sides of the blades 90 in the laterally outermost flight thereof and thereupon be deflected by the blades 90 of such outer flight 80 toward the medial plane of the unit 18 and also forwardly toward the apex 24 of the unit 18 so as to impinge against the rear and concave sides of the blades 90 in the laterally innermost flight 82 thereof whereupon the wind is then deflected rearwardly and from the apex 24 so as to pass from the unit 18.

The deflection of the air constituting the relative wind by the outer flight of the blades causes a reactive force against each of such blades 90 as to produce a force component urging the outer flight 80 to move rearwardly from the apex 24. Also according to well known aerodynamic effects, a pressure reduction occurs on the convex side of the blade that supplements the force on the concave side of the blade 90. The subsequent deflection of air previously deflected by the outer blade flight 80 by the inner blade flight 82 produces an aerodynamically supplementated reaction force having a force component urging the inner blade flight 82 forwardly or toward the apex 24.

The opposite direction of the reactive and aerodynamic forces on the inner and outer blade flights 80 and 82 are additive in their effect of causing the chains 64 to move in such a direction as to drive the shaft 48 to rotate in a counterclockwise direction as seen in FIG. 4. Such in turn drives the alternator 56; the net effect being that wind energy is converted to electrical energy through the agency of the linear turbine or power panel 40. In a perfectly analogous manner the power panel 42 forces clockwise rotation of a shaft 120 (counterpart of the shaft 48), as seen in FIG. 4, that drives an alternator, not shown, that is the counterpart of the alternator.

The electrical outputs of the alternators 56 are coupled whereby the shafts are effectively interconnected to rotate at identical velocities due to the alternators 56 interacting to operate in phase. If desired or deemed expedient, gear means (not shown) or the equivalent thereof can be interconnected to the shafts 48 and 120 to compel them to rotate in opposite directions at equal speeds with the windings of the alternators 56 being oriented on the shafts 48 and 120 to produce outputs in phase with each other.

It will be evident that the wind force on the power panels 40 and 42 produces a lateral force or torque on the power panels 40 and 42 urging the rear ends thereof toward the medial plane of the unit 18, with such torque increasing with increasing wind velocity. Advantage of this fact is taken to provide a substantial degree of protection for the power panels 40 and 42 against wind damage and incidentally tend to stabilize or limit the angular velocity of the shafts 48 and 120.

The means alluded to above comprises the previously mentioned pivotal or oscillatable mounting of the panels 40 and 42 about their shafts 48 and 120, the rear portions of the panels being slidably supported by the bottom wall 22 during such movement.

Corresponding means are provided for yieldingly urging the rear ends of the panels 40 and 42 laterally outward to the limiting positions shown thereof in FIG. 4. Such means as provided in association with the power panel 40 are shown in FIGS. 1 and 4 is designated at 126 and comprises an upstanding ear 128 fixed to the spar structure 52 and an abutment 130 fixed to the wall 22, with a coiled compression spring 132 having its opposite ends secured to the ear 128 and the abutment 130. Means, not shown, are fixed to the wall 22 to engage the spar structure 52 to limit outward movement of the panel 40 to the position shown thereof in FIG. 4, and the coiled compression spring 132 is preloaded to force the panel 40 normally against such stop means as will be readily understood. When the lateral wind force against the panel exceeds a value predetermined by the geometry of the system and the preloading of the spring 132, the panel 40 will swing inward against the yielding spring 132 and thereby reduce the effective exposure of the panel 40 to the wind and thereby reduce any tendency of the panel 40 to suffer wind damage.

The limited amount of pivotal motion permitted the blades 90 at the connection of their ends to the chains 64 is for the purpose of causing the reactive force exerted on the blade 90, during any portion of its circuitous travel, to not only urge movement of the chains 64 as previously described, but to cause the blade 90 to pivot relative to the chains 64 to a position tending to maximize the reactive force. Such is believed to occur as the blade 90 will pivot to align the pivotal axis of the pivot pins with the effective center of reactive force against the arcuate blade 90. This effect might be likened to a pail of water swinging about the pivotal connection of its bail to a vertical position maximizing the force through the pivotal connection.

It is to be noted that the blades 90 travel in closely spaced parallel planes in opposite directions as the chains 64 travel along their inner and outer flights. Such close spacing affords slightly more than free running clearance between the oppositely traveling blades 90, whereby the effectiveness and efficiency of the opposite fluid deflections are optimized. Maintenance of such close parallel spacing is possible by reason of the chains 64 being kept taut as previously described, and by the rollers 100 being guidingly received in the guide grooves 84 and 86 of both the upper and lower spar structures 52.

Although the unit 18 has been illustrated and described as suitable for extracting energy from the wind, it will be manifest that the unit 18 will function essentially as previously described when immersed in any relatively moving fluid whether the fluid is compressible as air or practically incompressible as in the case of water. Consequently, the unit 18 can be positioned in a stream or fast moving water channel to extract energy therefrom. In short, the unit 18 or any power panel 40 can be placed in any relatively moving fluid to extract energy therefrom. If a single power panel 40 is employed, it should be oriented obliquely to the direction of fluid motion as is the case in FIG. 4 assuming that fluid movement is parallel to the medial plane of the unit 18. Such oblique orientation means that it is preferred that the power panel be rotated from a position normal to the direction of fluid flow through an acute angle about an axis parallel to the sprocket shafts. In many situations, the orientation of the sprocket shafts themselves is immaterial, vertical or horizontal (as in the next to be described embodiment) or in between. In view of the previously described embodiment, those skilled in the art will find no difficulty in using any single or multiple array of power panels, whether their shafts are horizontal or vertical, to mount the same to weathervane or automatically turn to a position obliquely facing into the relatively moving fluid when the direction of the latter is variable.

While the power panel has been described as including sprockets and chains, which are preferred, the close kinship of sprockets and chains to pulleys and belts will be evident and indeed the latter can be used with each blade end having integral pin extensions embedded in a belt to maintain a fixed angular orientation between a blade and immediately adjacent part of the belt. In this regard, it should be noted that while preferred, it is not essential that the connection of the blades 90 to the chains 64 include provision for relative pivotal movement.

It will be obvious to those skilled in the art that the extracted energy can be applied to power electrical alternators as described or alternatively be applied to power machinery, drive hydraulic pumps, operate air compressors, etc., and in general be applied to meet many energy or power requirements.

Attention is now directed to the modification of the invention shown in FIGS. 7–10, wherein the reference numeral 150 designates generally a self propelled vehicle. The vehicle 150 includes a pair of front dirigible wheels 152 and a pair of rear wheels 154, and the vehicle includes a prime mover, not shown, of conventional character for the propulsion thereof, such prime mover being drivingly connected to the pair of ground wheels 152 and/or 154 in any conventional manner. The prime mover can be a conventional internal combustion system, which as a part of its ignition system and the usual electric starter includes an electric storage battery, or alternatively the prime mover can be one or more direct current electric motors in which event the vehicle is provided with electric storage batteries. In any event, the vehicle 150 does include an electric storage battery means indicated at 156, the charging of which constitutes a part of the energy requirements of the vehicle 150.

The vehicle 150 includes a body 158 enclosing a passenger or operator compartment 160 having a windshield 162 at its front.

The vehicle 150 is provided with means for extracting energy from relative wind resulting from its forward progress and utilizing such extracted energy to charge the electric storage battery means 156. Such means comprises the provision of a linear turbine or power panel 166 at the front of the vehicle 150. The power panel 166 is generally similar to the previously described power panels 40 and 42 and is disposed so that the plane thereof is such as to incline upwardly and rearwardly from adjacent the front bumper 168 of the vehicle 150 to adjacent the lower edge 170 of the windshield 162. The power panel 166 has a transverse extent less than the width of the vehicle 150 so as to be disposed inwardly of headlamps 172 of the vehicle 150 as clearly shown in FIG. 9.

The power panel 166 includes forward and rear shafts 174 that are journaled in a pair of parallel spar structures 178 that are suitably mounted on the vehicle in fixed relation to the body 158. A portion of one of the spar structures is shown in FIG. 10.

A pair of sprockets are fixed to the shaft 174 and a similar pair of sprockets 182 are fixed to the shaft 176. A pair of chains 184 are entrained over the sprockets as shown in FIG. 10 to define upper and lower chain flights. Idler sprockets 190 and 192 are provided for maintaining the chains 184 taut and for enabling closer spacing of the chain flights 186 and 188 than the diameters of the sprockets 180 and 182 would otherwise permit. Arcuate turbine blades 200 extend in parallelism to each other between the chains 184 and have their opposite ends connected to the adjacent sides of the chains 184 by means similar to those previously described with respect to the blades 90 and chains 64 of the power panel 40 so as to afford a limited pivotal movement for the blades 200 relative to the portions of the chains 184 to which they are attached. As shown in FIG. 10, the chains 184 include rollers 206 and such rollers 206 are slidingly and guidingly received in upper and lower guide grooves 208 and 210 in the spar structures 178, whereby the spacing of the upper and lower chain flights 186 and 188 are closely controlled in their spacing to afford a minimum free running clearance between blades on such flights.

The shafts 174 and 176 are connected to electrically interlocked electric alternators 220 and 222. Customary voltage regulator means, not shown, are provided for regulating the alternators 220 and 222 to a suitable voltage in relation to the voltage of the battery means 156. The regulated output of the alternators 220 and 222 is supplied to the battery means after rectification by conventional rectifying means, not shown.

The operation of the embodiment of the invention shown in FIGS. 7–10 will be readily understood. Forward movement of the vehicle 150 results in relative wind impinging upon the front of the vehicle 150 and against the concave side of the blades 200 on the upper and front chain flight 186, with the result that such blades 200 and the upper chain flight are urged upwardly and rearwardly relative to the shafts 174 and 176 with such wind being deflected downwardly and forwardly relative to the blades 200 on the lower chain flight 188 so as to be deflected by the latter in a downward and rearward direction to escape from the vehicle 150 through suitable openings, not shown, in the bottom of the body 158 underlying the power panel 166. The deflection of the air by the blades on the lower chain flight 188 urges the lower chain flight 188 forwardly and downwardly so as to supplement the reactive forces applied to the upper flights 186 of the chains 184, whereby the shafts 174 and 176 and their alternators 220 and 222 are forcefully driven.

As in the case of the power panels 40 and 42, the pivotal mounting of the blades 200 on the chains 184 allows the blades 200 to adjust automatically to optimize reactive forces thereagainst.

If the output of the power panel 166 exceeds the storage capacity of the battery 156 as may be the case if the prime mover is an internal combustion engine, the vehicle 150 can be hybridized to include direct electric motor drives to one pair of wheels to supplement the internal combustion engine drive to the other pair of wheels, with the direct current output power of the power panel being applied directly to the electric motor drives just as though the vehicle 150 were entirely an electrically powered vehicle. Such an arrangement will serve to lessen the amount of fuel required by the internal combustion prime mover.

The power unit 18 is preferably of metallic construction with aluminum being employed wherever possible in lieu of steel to conserve weight. Such is also true in the case of the vehicle 150. The blades 90 and 200 are preferably of a tough and resilient material so as to resist any permanent deformation during use. While some plastic materials can be employed, it is preferred that the same be a resilient form of aluminum or of stainless steel if employed in a corrosive environment.

Attention is now directed to the appended claims.

I claim:

1. A fluid motion actuated power panel comprising a series of spaced elongated turbine blades, means for guiding each of said blades to serially travel a closed endless path that includes substantially straight first and second portions that are in spaced parallelism to each other, means for maintaining the longitudinal extents of the blades traveling the first and second portions of the path in spaced parallelism with each other, said first and second portions of the path being in closely spaced proximity to each other with free running clearance and unobstructed space between the blades moving therealong, orienting means for turning the power panel while maintaining the path portions of the panel oblique to the direction of ambient fluid flow and while also maintaining the extents of the blades traveling said path portions substantially perpendicular to the direction of ambient fluid flow, said path portions and the blades being so constructed and arranged that the blades move along said first and second portions in opposite directions and so that relative ambient fluid flow can sequentially pass through and react with the blades moving along the first and second portions of the path, mechanical means encompassed in their entirety in connections of the guide means to the blades for maintaining the blades moving respectively along the first and second portions of the path oriented to react with a relative ambient fluid flow sequentially passing through the blades moving along such portions to urge the described movement of the blades, and energy transducing means operatively coupled to the blades to be driven by the latter to produce an energy output, said blades being arcuate in transverse section and having concave sides, with the blades moving along the first and second path portions having their concave sides facing directions that are respectively directed generally opposite the direction of their movements along their respective path portions, and means for mounting the panel so that the extents of said path portions lie in a common vertical plane with the extents of said path portions being substantially inclined to the vertical, with said means for mounting including a self-propelled and dirigible automotive vehicle.

2. A fluid motion actuated power panel comprising a series of spaced elongated turbine blades, means for guiding each of said blades to serially travel a closed endless path that includes substantially straight first and second portions that are in spaced parallelism to each other, means for maintaining the longitudinal extents of the blades traveling the first and second portions of the path in spaced parallelism with each other, said first and second portions of the path being in closely spaced proximity to each other with free running clearance and unobstructed space between the blades moving therealong, orienting means for turning the power panel while maintaining the path portions of the panel oblique to the direction of ambient fluid flow and while also maintaining the extents of the blades traveling said path portions substantially perpendicular to the direction of ambient fluid flow, said path portions and the blades being so constructed and arranged that the blades move along said first and second portions in opposite directions and so that relative ambient fluid flow can sequentially pass through and react with the blades moving along the first and second portions of the path, mechanical means encompassed in their entirety in connections of the guide means to the blades for maintaining the blades moving respectively along the first and second portions of the path oriented to react with a relative ambient fluid flow sequentially passing through the blades moving along such portions to urge the described movement of the blades, and energy transducing means operatively coupled to the blades to be driven by the latter to produce an energy output, said blades being arcuate in transverse section and having concave sides, with the blades moving along the first and second path portions having their concave sides facing directions that are respectively directed generally opposite the direction of their movements along their respective path portions, and means for mounting the panel so that the extents of said path portions lie in a common horizontal plane with the extents of said path portions being horizontal, said means for guiding the blades includes an endless elongated flexible member entrained over a plurality of guide elements rotatable about vertical axes, with said blades being attached to said member at spaced positions along the extent of the latter, and a second power panel disposed adjacent the first mentioned power panel in a V-shaped configuration therewith in the horizontal plane, each of said panels having forward and rear ends with the former of each power panel being adjacent the apex of the V-shaped configuration, said mounting means for the panels including said orienting means being responsive to ambient fluid flow to orient the apex directly into ambient fluid flow and also including means for pivotally mounting the forward ends of the panels about vertical pivots, whereby the rear ends of the panels can pivotally swing toward and away from each other, and spring means yielding opposing relative closing movement of the rear ends of the panels, the arrangement being such that relatively higher ambient fluid flow velocity will cause relative closing movement of the rear ends of the panels against the action of the spring means and consequent sharpening of the angle of the apex and reduction of the presentation of the panels to ambient fluid flow and the risk of damage therefrom.

3. A fluid actuated turbine power panel comprising a pair of parallelly spaced, elongated spars having parallel shafts rotatably carried thereby and extending therebetween adjacent their opposite ends, each of said shafts being provided with a pair of pulleys adjacent its opposite ends, a pair of parallelly spaced endless flexible members entrained over the pulleys in an arrangement such that the members move in unison in proximity to the respective spars during rotation of the shafts, idler pulley means carried by the spars adjacent the pulleys for causing each member to have two closely spaced first and second parallel flights between the two shafts, each of said spars and the endless member adjacent thereto having coacting guide means for maintaining the spacing of the parallel flights of such members, and a plurality of elongated turbine blades of arcuate transverse section extending, in spaced parallelism to each other and the shafts, between and having their opposite ends attached to the endless members, said blades attached to the members of the first and second flights of the members being in closely spaced proximity to each other with free running clearance and unobstructed space therebetween, said arcuate blades having in transverse section a concave side having first and second opposite marginal extents, with both of such marginal extents of each blade extending to its free marginal edge in directions having direction components in the same direction with respect to the direction of travel of the members at the positions of attachment of such blade to the latter, orienting means for turning the power panel so that the direction of ambient fluid flow is oblique relative to the extent of the spars and also perpendicular relative to the extent of the blades, and energy transducer means operatively driven by one of said shafts, said panel being mounted on a self propelled dirigible vehicle at a position exposed to relative wind occasioned by movement of the vehicle, said vehicle having an energy input requirement, and said energy transducer means being applied to meet, at least in part, said energy input requirement.

4. A fluid actuated turbine power panel comprising a pair of parallelly spaced, elongated spars having parallel shafts rotatably carried thereby and extending therebetween adjacent their opposite ends, each of said shafts being provided with a pair of pulleys adjacent its opposite ends, a pair of parallelly spaced endless flexible members entrained over the pulleys in an arrangement such that the members move in unison in proximity to the respective spars during rotation of the shafts, idler pulley means carried by the spars adjacent the pulleys for causing each member to have two closely spaced first and second parallel flights between the two shafts, each of said spars and the endless member adjacent thereto having coacting guide means for maintaining the spacing of the parallel flights of such members, and a plurality of elongated turbine blades of arcuate transverse section extending, in spaced parallelism to each other and the shafts, between and having their opposite ends attached to the endless members, said blades attached to the members of the first and second flights of the members being in closely spaced proximity to each other with free running clearance and unobstructed space therebetween, said arcuate blades having in transverse section a concave side having first and second opposite marginal extents, with both of such marginal extents of each blade extending to its free marginal edge in directions having direction components in the same direction with respect to the direction of travel of the members at the positions of attachment of such blade to the latter, orienting means for turning the power panel so that the direction of ambient fluid flow is oblique relative to the extent of the spars and also perpendicular relative to the extent of the blades, and energy transducer means operatively driven by one of said shafts, said orienting means comprising said power panel being mounted on a self propelled, dirigible automotive vehicle in an arrangement such that, during substantial forward velocity of the vehicle, the direction of relative wind impinging on the panel is maintained substantially in the recited direction.

5. The combination of claim 4, wherein said power panel is mounted at a forwardly facing and exposed position on the top of and adjacent the front end of the vehicle, said panel being disposed in an inclined attitude sloping downwardly toward the front end of the vehicle, with the extents of the blades being horizontally disposed and transverse to the forward direction of the vehicle.

6. A fluid actuated turbine power panel comprising a pair of parallelly spaced, elongated spars having parallel shafts rotatably carried thereby and extending therebetween adjacent their opposite ends, each of said shafts being provided with a pair of pulleys adjacent its opposite ends, a pair of parallelly spaced endless flexible members entrained over the pulleys in an arrangement such that the members move in unison in proximity to the respective spars during rotation of the shafts, idler pulley means carried by the spars adjacent the pulleys for causing each member to have two closely spaced first and second parallel flights between the two shafts, each of said spars and the endless member adjacent thereto having coacting guide means for maintaining the spacing of the parallel flights of such members, and a plurality of elongated turbine blades of arcuate transverse section extending, in spaced parallelism to each other and the shafts, between and having their opposite ends attached to the endless members, said blades attached to the members of the first and second flights of the members being in closely spaced proximity to each other with free running clearance and unobstructed space therebetween, said arcuate blades having in transverse section a concave side having first and second opposite marginal extents, with both of such marginal extents of each blade extending to its free marginal edge in directions having direction components in the same direction with respect to the direction of travel of the members at the positions of attachment of such blade to the latter, orienting means for turning the power panel so that the direction of ambient fluid flow is oblique relative to the extent of the spars and also perpendicular relative to the extent of the blades, and energy transducer means operatively driven by one of said shafts, means for mounting the panel for exposure to a moving fluid, and means for reducing the exposure of the panel to a moving fluid in response to the velocity of the fluid exceeding a predetermined value, said last means comprising said orienting means including spring means for varying the orientation of the panel to vary the degree of said obliqueness in response to the amount of force exerted upon the panel by relative ambient fluid flow.

7. A fluid actuated turbine power panel comprising a pair of parallelly spaced, elongated spars having parallel shafts rotatably carried thereby and extending therebetween adjacent their opposite ends, each of said shafts being provided with a pair of pulleys adjacent its opposite ends, a pair of parallelly spaced endless flexible members entrained over the pulleys in an arrangement such that the members move in unison in proximity to the respective spars during rotation of the shafts, idler pulley means carried by the spars adjacent the pulleys for causing each member to have two closely spaced first and second parallel flights between the two shafts, each of said spars and the endless member adjacent thereto having coacting guide means for maintaining the spacing of the parallel flights of such members, and a plurality of elongated turbine blades of arcuate transverse section extending, in spaced parallelism to each other and the shafts, between and having their opposite ends attached to the endless members, said blades attached to the members of the first and second flights of the members being in closely spaced proximity to each other with free running clearance and unobstructed space therebetween, said arcuate blades having in transverse section a concave side having first and second opposite marginal extents, with both of such marginal extents of each blade extending to its free marginal edge in directions having direction components in the same direction with respect to the direction of travel of the members at the positions of attachment of such blade to the latter, orienting means for turning the power panel so that the direction of ambient fluid flow is oblique relative to the extent of the spars and also perpendicular relative to the extent of the blades, and energy transducer means operatively driven by one of said shafts, said spars being horizontally disposed and vertically spaced with the extents of the blades being vertical, and a second power panel disposed adjacent the first mentioned power panel in a V-shaped configuration therewith in the horizontal plane, each of said panels having forward and rear ends with the former of each power panel pg,26 being adjacent the apex of the V-shaped configuration, said orienting means being responsive to ambient fluid flow to orient the apex directly into ambient fluid flow, means for pivotally mounting the forward ends of the panels about vertical pivots, whereby the rear ends of the panels can pivotally swing toward and away from each other, and spring means yielding opposing relative closing movement of the rear ends of the panels, the arrangement being such that relatively higher ambient fluid flow velocity will cause relative closing movement of the rear ends of the panels against the action of the spring means and consequent sharpening of the angle of the apex and reduction of the presentation of the panels to ambient fluid flow and the risk of damage therefrom.

* * * * *